United States Patent
Hu

(10) Patent No.: US 9,417,449 B2
(45) Date of Patent: Aug. 16, 2016

(54) HEAD-UP DISPLAY SYSTEM

(71) Applicant: Che-Chang Hu, Tainan (TW)

(72) Inventor: Che-Chang Hu, Tainan (TW)

(*) Notice: Subject to any disclaimer, the term of this patent is extended or adjusted under 35 U.S.C. 154(b) by 194 days.

(21) Appl. No.: 14/246,110

(22) Filed: Apr. 6, 2014

(65) Prior Publication Data

US 2015/0286053 A1    Oct. 8, 2015

(51) Int. Cl.
*G02B 27/01* (2006.01)

(52) U.S. Cl.
CPC ....... *G02B 27/0101* (2013.01); *B60R 2300/205* (2013.01); *G02B 2027/012* (2013.01); *G02B 2027/015* (2013.01); *G02B 2027/0118* (2013.01); *G02B 2027/0121* (2013.01)

(58) Field of Classification Search
CPC ........... G02B 27/0172; G02B 27/0101; G02B 27/017; G02B 27/01; G02B 2027/0118; G02B 2027/015; G02B 2027/0145; G02B 6/06; G02B 6/041; G02B 6/4249; G02B 6/262; G02B 6/0006; G02B 6/0008; G02B 6/3672; G02B 6/0053; G02B 6/0076; G02B 6/0033; G02B 6/0036; G02B 6/24; G02B 6/264; G02B 6/34; G02B 6/0073; G02B 2027/012; G02B 2027/0121; G02F 1/133308; G02F 2001/133314; B60R 2300/205
USPC ......... 349/11, 58; 359/13, 630; 385/115, 116, 385/119, 121; 362/602, 606, 607, 616, 620, 362/554, 561, 612, 613, 487–489, 503
See application file for complete search history.

(56) References Cited

U.S. PATENT DOCUMENTS

| | | | | |
|---|---|---|---|---|
| 6,246,505 B1* | 6/2001 | Teowee | ............. | B32B 17/10036 359/241 |
| 6,771,866 B2* | 8/2004 | Iimura | ............. | G02B 6/02 385/12 |
| 2009/0141178 A1* | 6/2009 | Kerofsky | ............. | G09G 3/3426 348/700 |
| 2009/0316431 A1* | 12/2009 | Nagata | ............. | G02B 6/0028 362/609 |
| 2012/0056736 A1* | 3/2012 | Katoh | ............. | B60K 35/00 340/439 |
| 2013/0010228 A1* | 1/2013 | Hsiao | ............. | G02B 6/0085 349/62 |
| 2013/0194674 A1* | 8/2013 | Horiuchi | ............. | G02B 27/0101 359/631 |
| 2013/0265526 A1* | 10/2013 | Park | ............. | G02B 6/0073 349/65 |
| 2013/0322820 A1* | 12/2013 | Zwick | ............. | G02B 6/262 385/31 |

* cited by examiner

*Primary Examiner* — Paisley L Arendt
*Assistant Examiner* — Angela Davison
(74) *Attorney, Agent, or Firm* — Roger D. Emerson; Emerson Thomson Bennett, LLC

(57) ABSTRACT

A head-up display system is disclosed and has a transparent reflecting medium and a flat display panel. The flat display panel is disposed in front of the transparent reflecting medium at an angle with respect to the transparent reflecting medium, and generates a display image. The flat display panel has a display area of X square millimeters and has a light source that emits light with a luminous flux of Y lumens, satisfying a relationship of $Y > (3e-10X^2 + 0.0283X + 2.5298)$, so that the display image is projected onto the transparent reflecting medium in a lensless way. With the head-up display system, the visibility of the display image projected on a front windshield is improved.

17 Claims, 7 Drawing Sheets

HEAD-UP DISPLAY SYSTEM

TECHNICAL FIELD

The present disclosure relates to a head-up display system used in a vehicle, an aircraft or any display system that may has a bright background, and more particularly to a head-up display system that can provide a brighter image display during daylight hours.

BACKGROUND

A head-up display (HUD) is an auxiliary apparatus used in vehicles or aircrafts which displays and projects an image presenting dashboard information upon a transparent screen body, such as a windshield, located in front of the observer. The image projected on the screen body will be reflected back to the observer, so that the observer is able to directly read the dashboard information without lowering his head to watch the dashboard. Therefore, the head-up display can avoid interruption of driving attention, thereby increasing driving safety.

In general, a conventional head-up display system includes an image projector, at least one reflecting mirror and at least one lens all installed on the top of the dashboard. The reflecting mirror and the lens are arranged between the image projector and the windshield of the vehicle to change the optical path and concentrate light, in order to correctly and clearly project a virtual image on the windshield.

In the above conventional head-up display system, there is a problem in that the contrast between the virtual image and the background decreases under bright daylight. Since the projector cannot provide virtual images with enough luminous intensity to improve the contrast, the visibility of the virtual image deteriorates.

Besides, the dashboard of a vehicle requires a certain amount of space for installing the above-mentioned conventional head-up display system, which has become a restricting factor for the structure design of the vehicle.

Therefore, in order to solve the problems existing in the conventional technology, as described above, the present disclosure seeks to develop a head-up display system for a vehicle which is able to produce virtual images with high contrast and high intensity of illumination, thereby improving visibility of the display image projected on a front windshield.

SUMMARY

The present disclosure provides a head-up display system which can improve visibility of the display image on a windshield, especially during daylight hours.

In order to achieve the foregoing, the present disclosure provides a head-up display system having a transparent reflecting medium and a flat display panel. The flat display panel is disposed in front of the transparent reflecting medium at an angle with respect to the transparent reflecting medium, and generates a display image. The flat display panel has a display area of X square millimeters and has a light source that emits light with a luminous flux of Y lumens, satisfying a relationship of $Y > (3e-10X^2 + 0.0283X + 2.5298)$, so that the display image is projected onto the transparent reflecting medium in a lensless way.

Compared with the aforementioned conventional technology, the present disclosure provides a head-up display system that directly projects a display image on a transparent reflecting medium in a lensless way such that an observer, such as a driver, can still clearly see the image under normal daylight conditions, and thereby improving visibility of the display image projected on a front windshield. Besides, the flat display panel of the head-up display system can be directly placed on the top of the dashboard of the vehicle, so that the installation space for conventional head-up display system can be saved.

In order to make the contents of the present disclosure more easily understood, the embodiments of the present disclosure are described in detail, in cooperation with accompanying drawings, as follows:

DETAILED DESCRIPTION

The following description refers to the accompanying drawings to illustrate practicable embodiments in accordance with the present disclosure. The directional terms described in the present disclosure, such as upper, lower, front, rear, left, right, inner, outer, side, etc., are only directions referred to in the accompanying drawings for purposes of describing and understanding the present disclosure, however, the present disclosure is not limited thereto.

Figure 1:
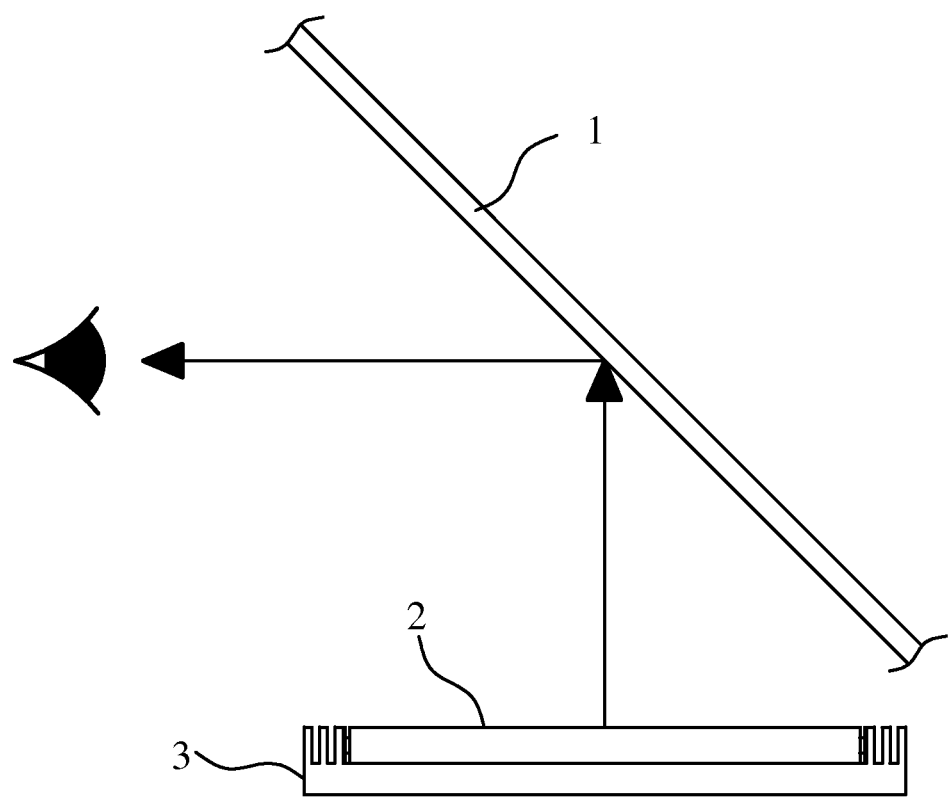
FIG. 1 is a schematic side view of a head-up display system according to one embodiment of the present disclosure.
Figure 2:
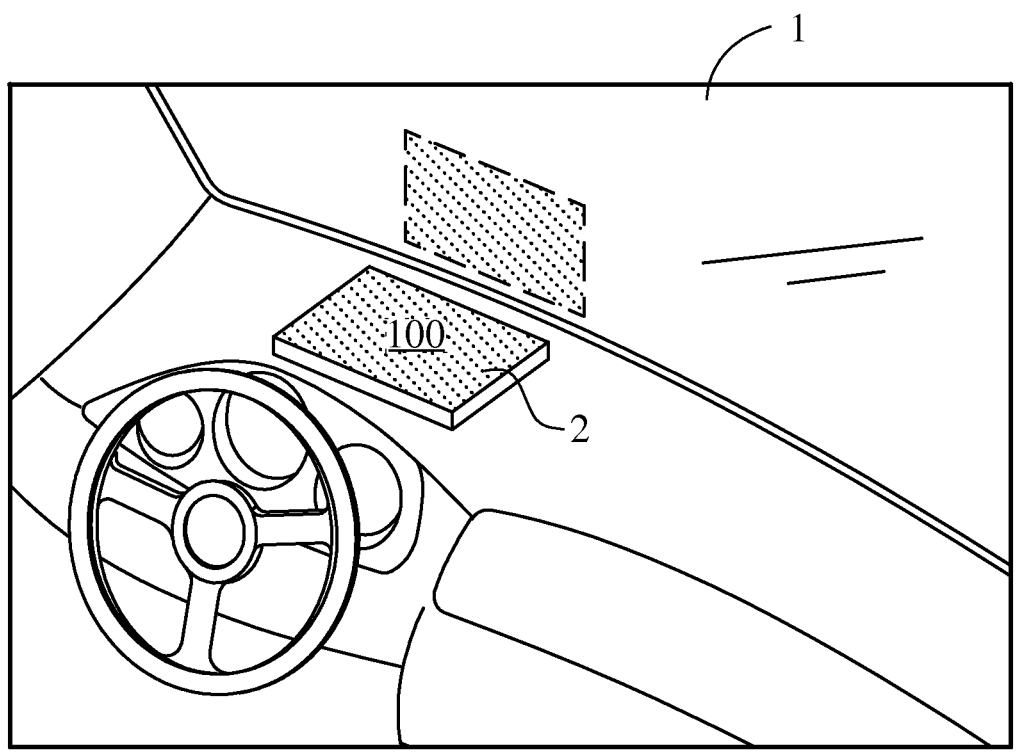
FIG. 2 is an operational view of the head-up display system according to one embodiment of the present disclosure.
Figure 3:
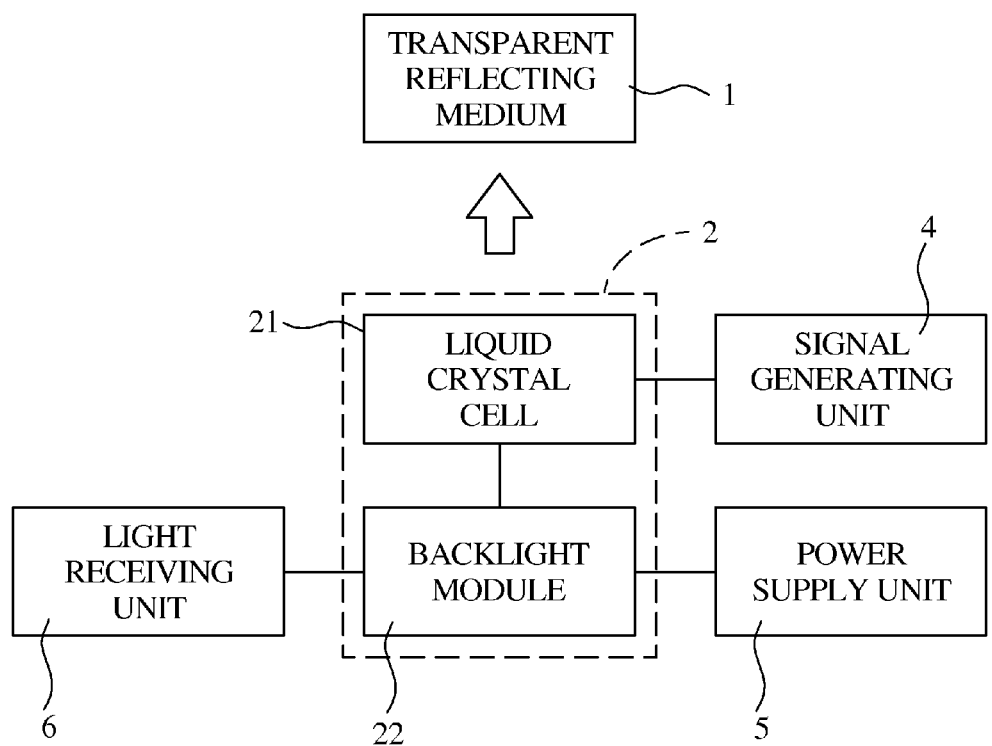
FIG. 3 is a block diagram representing one embodiment of the head-up display system of the present disclosure.

With reference to FIGS. 1, 2, and 3, a head-up display system of an embodiment in accordance with the present disclosure mainly comprises a transparent reflecting medium 1 and a flat display panel 2, and may further comprise a heat-dissipating base 3.

As shown in FIG. 2, in the head-up display system, the transparent reflecting medium 1 may be a windshield, and preferably a front windshield of a vehicle, such as an automobile. The surface of the transparent reflecting medium 1 may be fully or partially provided with a luminous flux controlling film (not shown). The luminous flux controlling film can lower the illuminance of daylight to a more desirable level, and may be made of photochromic material which may be transition-metal oxide, metal halide or the combination thereof. For example, the photochromic material may be silver bromide (AgBr). In another embodiment, the transparent reflecting medium 1 may be a windshield glass mixed with photochromic materials.

The term "flat display panel" is referring to a display device which has a plurality of pixel units arranged in a matrix and may be a TFT-LCD (Thin Film Transistor Liquid Crystal Display) panel, an OLED (Organic Light Emitting Diode) panel, and so forth. As shown in FIGS. 1 and 2, the flat display panel 2 is disposed in front of the transparent reflecting medium 1, being at an angle with respect to the transparent reflecting medium 1. The flat display panel 2 may be connected to a dashboard display unit or a signal generating unit through a wired interface or a wireless interface to receive display signals, so that it can accordingly generate a display image 100 which may represent dashboard information, GPS information, traffic information, and so forth. The flat display panel 2 has a light source that emits light with sufficient luminous flux so that the display image 100 is projected onto the transparent reflecting medium 1 in a lensless way. The projected image on the transparent reflecting medium 1 will be the reverse of the original display image 100 on the screen of the flat display panel 2.

Figure 4A:
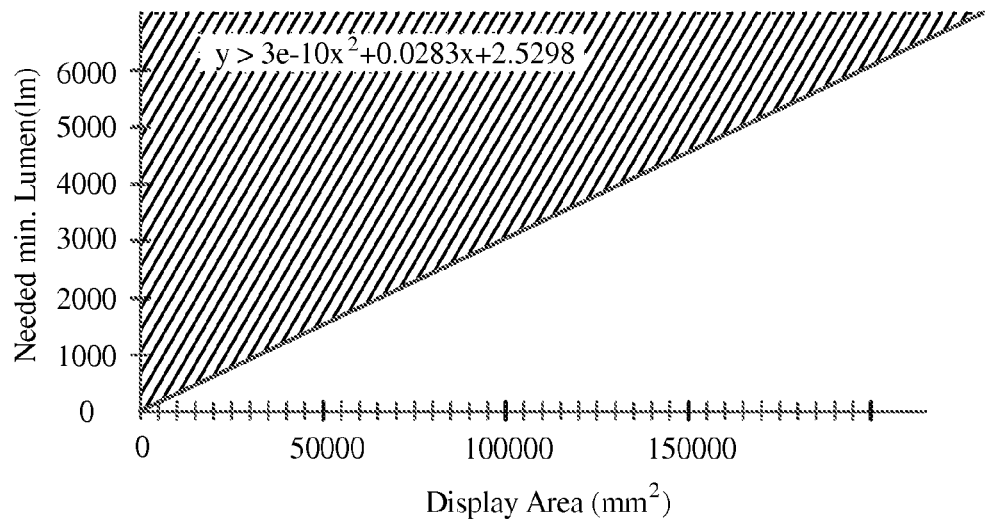
FIG. 4A is a curve diagram showing the inequality relationship between the display area and the needed luminous flux of a flat display panel of the head-up display system according to one embodiment of the present disclosure.

With further reference to FIG. 4A, the flat display panel 2 has a display area of X square millimeters (mm$^2$), and the light source emits light with a luminous flux of Y lumens (lm). The display area of X mm$^2$ and the luminous flux of Y lms satisfy a relationship of $Y>(3e-10X^2+0.0283X+2.5298)$, where the number e is the base of the natural logarithm which approximately equal to 2.71828. For example, when the flat display panel 2 has a display area of 50000 square millimeters, the luminous flux of the light source of the flat display panel 2 is greater than 1418 lumens. When the flat display panel 2 has a display area of 100000 square millimeters, the luminous flux of the light source of the flat display panel 2 is greater than 2835 lumens. With such luminous flux of the light source for certain sizes of the flat display panel, the flat display panel 2 is able to project the display image 100 on the transparent reflecting medium 1 that can be clearly perceived by the observer even under normal daylight conditions.

Figure 4B:
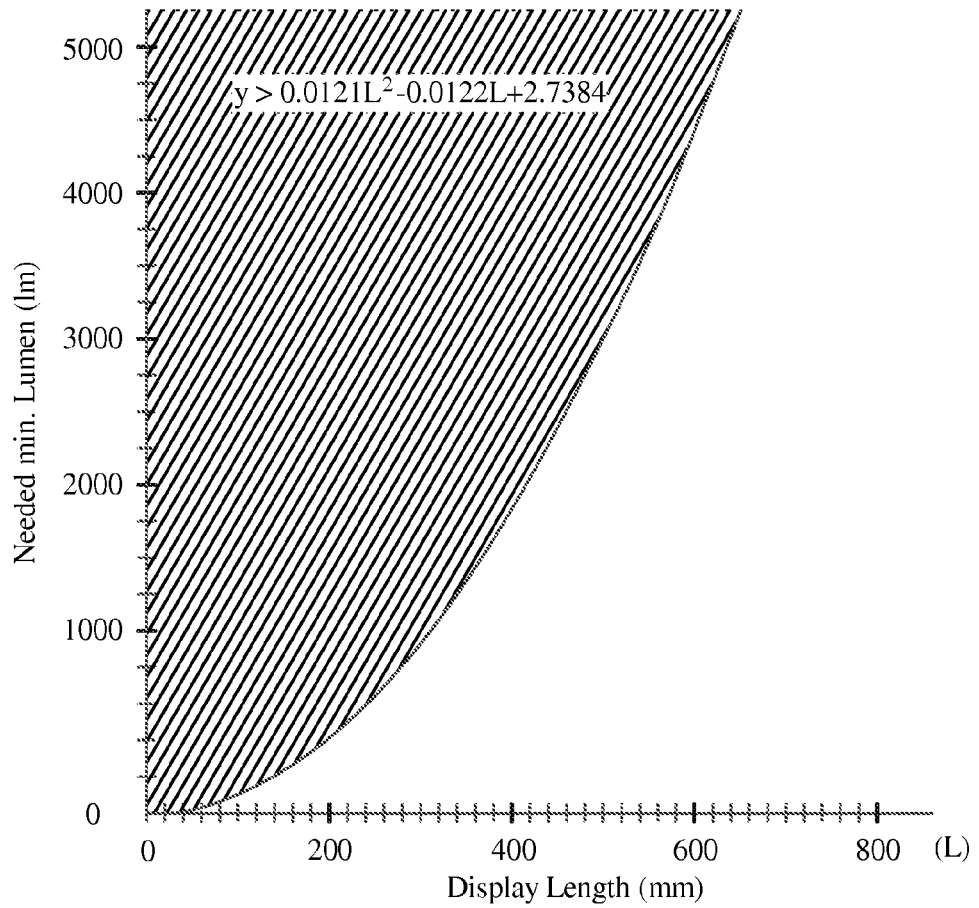
FIG. 4B is a curve diagram showing the inequality relationship between the diagonal length and the needed luminous flux of the flat display panel of the head-up display system according to one embodiment of the present disclosure.

In another embodiment, with reference to FIG. 4B, the flat display panel 2 has a diagonal length of L millimeters (mm). The diagonal length of L mm and the luminous flux of Y lms satisfy a relationship of $Y>0.0121L^2-0.0122L+2.7384$.

The following is the detailed description of the structure of the flat display panel 2.

Figure 5:
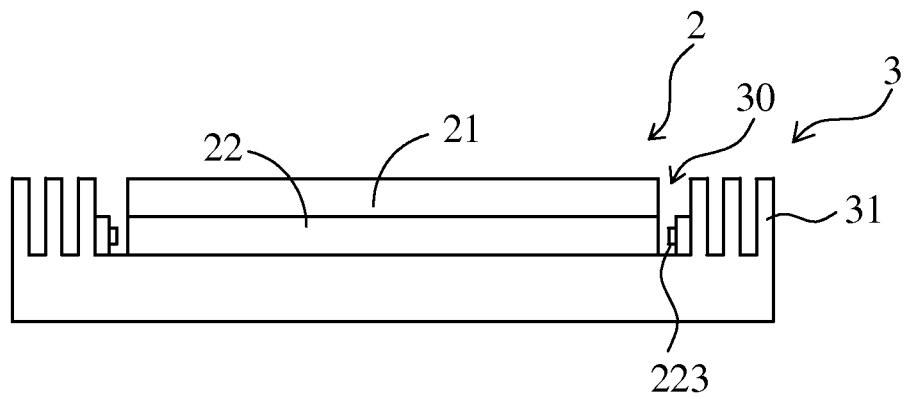
FIG. 5 is a schematic side view of a flat display panel and a heat-dissipating base of the head-up display system according to one embodiment of the present disclosure.

With reference to FIGS. 3 and 5, in one embodiment of the present disclosure, the flat display panel 2 may include a liquid crystal cell 21 and a backlight module 22.

The liquid crystal cell 21 of the flat display panel 2 may be connected to a signal generating unit 4 to receive display signals from the signal generating unit 4 and then accordingly generate the foregoing display image 100. In general, the liquid crystal cell 21 may include a thin-film transistor substrate, a color filter substrate, and a liquid crystal layer held between the thin-film transistor substrate and the color filter substrate.

In the present embodiment, the backlight module 22 is the light source of the liquid crystal cell 21 and emits light with the foregoing luminous flux of Y lumens (lm), and may have the same size as the flat display panel 2. The backlight module 22 and the liquid crystal cell 21 may be assembled on a backboard. The backboard may have an angle adjusting mechanism that is used to adjust the angle between the flat display panel 2 and the transparent reflecting medium 1. The backlight module 22 may be an edge-type or a direct type backlight module, and may be connected to a power supply unit 5. The power supply unit 5 is the battery system of a vehicle or a solar battery and is used to provide electric energy to the backlight module 22 and the liquid crystal cell 21 of the flat display panel 2. Furthermore, in order to provide more luminance, the backlight module 22 may be connected to a light receiving unit 6 through optical fibers so as to receive outdoor light collected by the light receiving unit 6.

Figure 7:
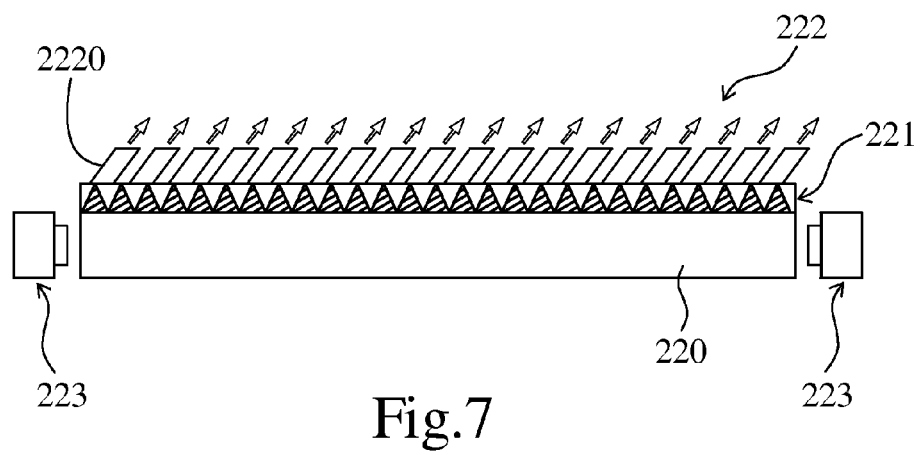
FIG. 7 is a schematic side view of a backlight module of the flat display panel of the head-up display system according to one embodiment of the present disclosure.

With further reference to FIG. 7, in one embodiment of the present disclosure, in order to provide light with sufficient luminous flux to satisfy the foregoing relationship described in FIG. 4A or 4B, the backlight module 22 may include a light guide plate 220, a micro-structure array 221, an optical fiber module 222, and at least one light-emitting module 223. The light guide plate 220 has at least one incident surface and a light-outputting surface. The micro-structure array 221 is formed on the light-outputting surface and may be integrally formed with the light guide plate 220 and may include a plurality of elongated prism members arranged in parallel. Each elongated prism member may have a triangular cross-section and may have a length direction being perpendicular to the incident surface of the light guide plate 220.

Figure 8:
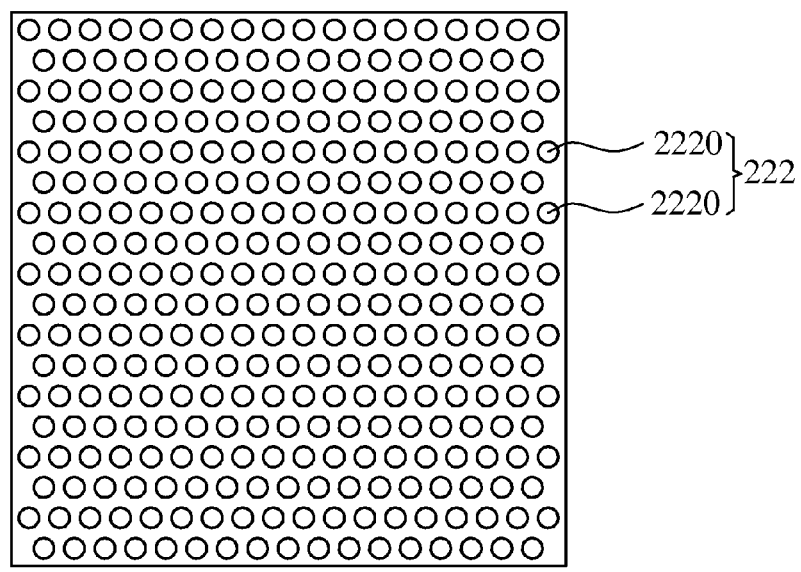
FIG. 8 is a top view of the backlight module in FIG. 7.
Figure 9:
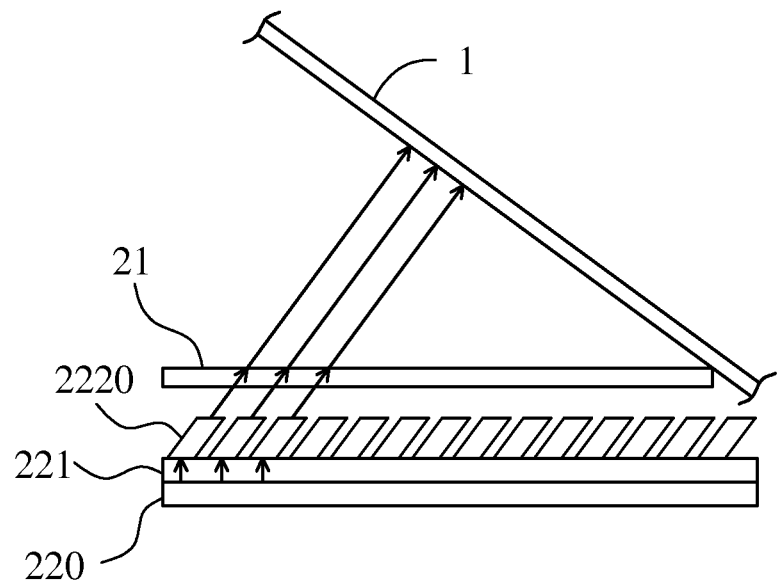
FIG. 9 is a schematic side view of a head-up display system using the backlight module shown in FIG. 7.

With further reference to FIGS. 8 and 9, the optical fiber module 222 is mounted on the micro-structure array 221 and includes a plurality of optical fibers 2220 arranged in a matrix at intervals. Each of the optical fibers 2220 stands on the top of the micro-structure array 221, and slants toward the transparent reflecting medium 1 so that light outputted from the optical fibers 2220 can be redirected to be more perpendicularly to the transparent reflecting medium 1. Each of the optical fibers 2220 receives light outputted from the micro-structure array 221 with a bottom end and outputs the received light with a top end. Preferably, the bottom end of each optical fiber 2220 is aligned with a top end of a corresponding elongated prism member. The micro-structure array 221 and the optical fibers 2220 are used to not only enhance the directionality of light, but also redirect light so that it can approach the transparent reflecting medium 1 along the normal direction (perpendicular to the transparent reflecting medium 1) as far as possible. Therefore, the luminous flux in the normal direction to the surface of the transparent medium 1 can be increased. The light-emitting module 223 is disposed beside the light guide plate 220 and faces the incident surface of the light guide plate 220 (not shown in the Figure), and may include a plurality of light-emitting units, such as OLED, LED, or CCFL. Light emitted from the light-emitting module 223 enters the light guide plate 220 from the incident surface, and then leaves the light guide plate 220 from the light-outputting surface. The light which has been scattered then is further concentrated by the micro-structure array 221 and the optical fiber module 222 so as to increase its directionality. Especially, with the optical fibers 2220 being slanting toward the transparent reflecting medium 1, the light outputted from the optical fibers 2220 through total internal reflection can be redirected and concentrated in a normal direction to the surface of the transparent reflecting medium 1 to increase the intensity of illumination. Therefore, the luminous flux of the light can achieve the desired luminous flux.

Figure 10:
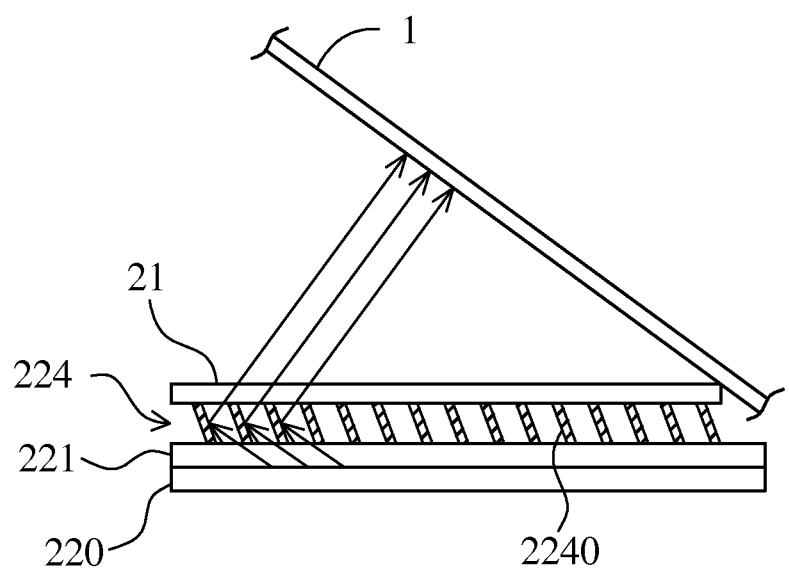
FIG. 10 is a schematic side view of a head-up display system using a backlight module provided with a reflecting mirror array according to one embodiment of the present disclosure.

With reference to FIG. 10, FIG. 10 is a schematic view showing another embodiment of the backlight module 22. This embodiment differs from the foregoing embodiment in FIG. 9 in that: the backlight module 22 includes a reflecting mirror array 224 instead of including the optical fiber module 222. The reflecting mirror array 224 is also mounted on the micro-structure array 221 and includes a plurality of reflecting mirror units 2240 arranged in a matrix at intervals. Each of the reflecting mirror units 2240 is at an oblique angle with respect to an outputting surface of the micro-structure array 221, wherein the oblique angle can be adjusted as desired. With such an arrangement of the reflecting mirror units 2240, light came from the micro-structure array 221 can be redirected through mirror reflection to be more perpendicular to the transparent reflecting medium 1. Therefore, the outputted light can be concentrated in the normal direction of the surface of the transparent reflecting medium 1, and the luminous flux can be increased to a desired level.

In another embodiment, the backlight module 22 may be further connected to an ambient light sensor. The ambient light sensor is used to detect environmental illumination changes and then automatically send a corresponding signal to the backlight module 22, so that the backlight module 22 can accordingly adjust the light intensity of the light-emitting module 223. For example, when the outdoor luminance exceeds a certain level, the backlight module 22 then increases the light intensity of its light-emitting module 223, so that the projected display image 100 can still be seen on the transparent reflecting medium 1. When the outdoor luminance decreases, the backlight module 22 then correspondingly lowers the light intensity of its light-emitting module 223 so as to save power.

In another embodiment, the backlight module 22 may be a direct-type backlight module that uses an LED array without a light guide plate.

In another embodiment, the flat display panel 2 may be an OLED display panel that does not require a liquid crystal cell and a backlight module.

Figure 6:
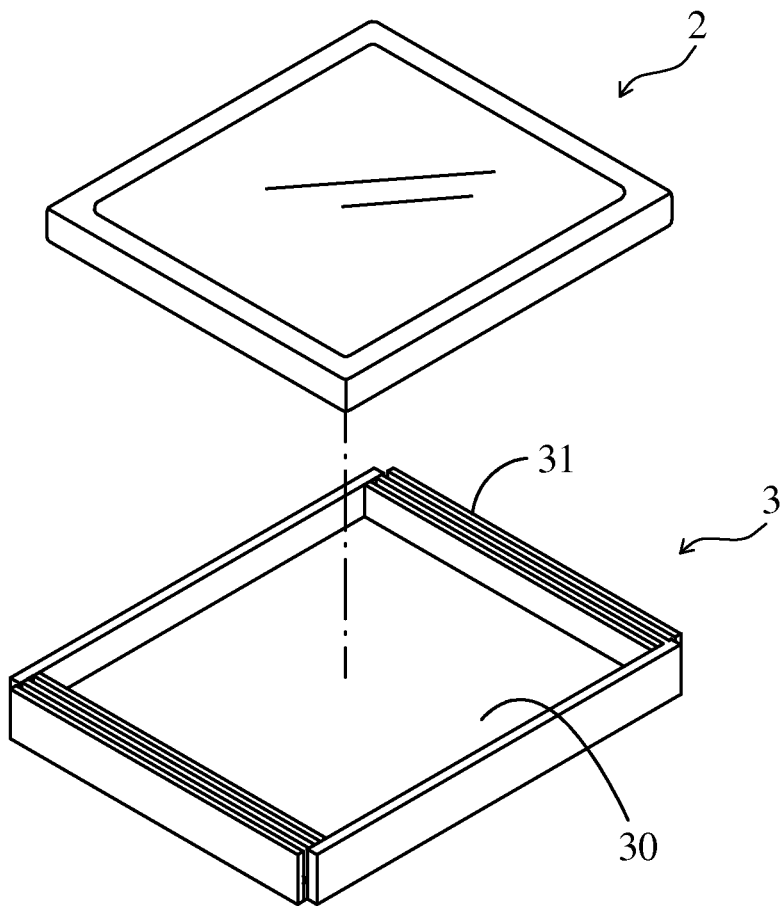
FIG. 6 is an exploded perspective view of the flat display panel and the heat-dissipating base of the head-up display system according to one embodiment of the present disclosure.

With reference to FIGS. 5 and 6, the heat-dissipating base 3 may be made of aluminium, aluminium alloy, cooper, or the like. For example, the heat-dissipating base 3 is integrally formed by aluminium extrusion or aluminium molding and has an accommodating room 30 formed on a top surface of the heat-dissipating base 3 for holding the flat display panel 2. As shown in FIG. 6, the heat-dissipating base 3 may have at least two extension portions respectively disposed at two opposite sides. Each extension portion has a plurality of heat-dissipating fins 31 formed thereon. The heat-dissipating fins 31 are arranged in parallel with intervals therebetween for enhancing the heat dissipation effect. Also, each heat-dissipating fin 31 may extend in a perpendicular direction or a parallel direction with respect to the side of the heat-dissipating base 3. The light-emitting module 223 may include a printed circuit board and a plurality of light-emitting diodes (LED) mounted on the printed circuit board, wherein the printed circuit board may be directly attached to an inner sidewall of the heat-dissipating base 3 close to the heat-dissipating fins 31, as shown in FIG. 5.

The present disclosure provides a flat display panel having a light source with sufficient luminous flux that can directly project a display image on a transparent reflecting medium in a lensless way such that an observer, such as a driver, can clearly see the image under normal daylight conditions. Therefore, the present disclosure can improve visibility of the display image projected on the front windshield of a vehicle for the driver. Besides, the flat display panel can be directly placed on the top of the dashboard of the vehicle, so that the installation space of a conventional HUD system can be saved.

The present disclosure has been described with various exemplary embodiments thereof and it is understood that many changes and modifications to the described embodiments can be carried out without departing from the scope and the spirit of the present disclosure. Therefore, the present disclosure should not be limited to any single embodiment, but rather construed in breadth and scope in accordance with the recitations of the appended claims.

What is claimed is:

1. A head-up display system comprising:
a transparent reflecting medium;
a flat display panel being a TFT-LCD panel or an OLED panel, disposed in front of the transparent reflecting medium, being at an angle with respect to the transparent reflecting medium, and generating a display image that is directly projected onto the transparent reflecting medium, wherein the flat display panel has a display area of X square millimeters and has a light source that emits light with a luminous flux of Y lumens, where the numerical value of Y is greater than the numerical value of $(3e-10X^2+0.0283X+2.529)$, where e is the base of natural logarithm; wherein a lens is excluded from being between the transparent reflecting medium and the flat display panel.

2. The head-up display system as claimed in claim 1, wherein the flat display panel has a diagonal length of L millimeters, and the numerical value of Y is greater than the numerical value of $(0.0121L^2-0.0122L+2.7384)$.

3. The head-up display system as claimed in claim 1, wherein the light source of the flat display panel is a backlight module which includes a light guide plate, a micro-structure array, an optical fiber module, and at least one light-emitting module, wherein the micro-structure array is formed on a light-outputting surface of the light guide plate; the optical fiber module is mounted on the micro-structure array; and the light-emitting module is disposed beside the light guide plate and faces an incident surface of the light guide plate.

4. The head-up display system as claimed in claim 3, wherein the micro-structure array includes a plurality of elongated prism members arranged in parallel; the optical fiber module includes a plurality of optical fibers arranged in a matrix at intervals, wherein the optical fibers stand on the top of the micro-structure array and slant toward the transparent reflecting medium, and each of the optical fibers receives light outputted from the micro-structure array with a bottom end and outputs the received light with a top end.

5. The head-up display system as claimed in claim 4, wherein the bottom end of each optical fiber is aligned with a top end of a corresponding elongated prism member.

6. The head-up display system as claimed in claim 3, wherein the backlight module is connected to a light receiving unit through a plurality of optical fibers so as to receive outdoor light collected by the light receiving unit.

7. The head-up display system as claimed in claim 3, wherein the backlight module is connected to an ambient light sensor, wherein the ambient light sensor detects environmental illumination changes and then automatically sends a corresponding signal to the backlight module; and the backlight module accordingly adjusts the light intensity of the light-emitting module.

8. The head-up display system as claimed in claim 1, wherein the transparent reflecting medium is a windshield and has a surface provided with a luminous flux controlling film, wherein the luminous flux controlling film is made of photochromic material.

9. The head-up display system as claimed in claim 8, wherein the photochromic material is transition-metal oxide, metal halide or the combination thereof.

10. The head-up display system as claimed in claim 1, wherein the transparent reflecting medium is a windshield glass mixed with photochromic material.

11. The head-up display system as claimed in claim 3, wherein the head-up display system further comprises a heat-dissipating base; the heat-dissipating base has an accommodating room formed on a top surface of the heat-dissipating base for holding the flat display panel.

12. The head-up display system as claimed in claim 11, wherein the heat-dissipating base has at least two extension portions respectively disposed at two opposite sides, and each of the extension portions has a plurality of heat-dissipating fins formed thereon and arranged in parallel with intervals therebetween.

13. The head-up display system as claimed in claim 12, wherein the light-emitting module includes a printed circuit board and a plurality of light-emitting diodes mounted on the printed circuit board; and the printed circuit board is attached to an inner sidewall of the heat-dissipating base close to the heat-dissipating fins.

14. The array display panel as claimed in claim 1, wherein the flat display panel further has a liquid crystal cell; and the liquid crystal cell is connected to a signal generating unit to receive display signals from the signal generating unit and then accordingly generates the display image.

15. The head-up display system as claimed in claim 1, wherein the head-up display system further comprises a power supply unit; the power supply unit is a battery system of an automobile or a solar battery, and is used to provide electric energy to the flat display panel.

16. A head-up display system comprising:
a transparent reflecting medium;
a flat display panel being a TFT-LCD panel or an OLED panel, disposed in front of the transparent reflecting medium, being at an angle with respect to the transparent reflecting medium, and generating a display image that is directly projected onto the transparent reflecting medium, wherein the flat display panel has a display area of X square millimeters and has a light source that emits light with a luminous flux of Y lumens, where the numerical value of Y is greater than the numerical value of $(3e-10X^2+0.0283X+2.529)$, where e is the base of natural logarithm; wherein a lens is excluded from being between the transparent reflecting medium and the flat display panel; wherein the light source of the flat display panel is a backlight module which includes a light guide plate, a micro-structure array, a reflecting mirror array, and at least one light-emitting module, wherein the micro-structure array is formed on a light-outputting surface of the light guide plate; the reflecting mirror array is mounted on the micro-structure array; and the light-emitting module is disposed beside the light guide plate and faces the incident surface of the light guide plate.

17. The head-up display system as claimed in claim 16, wherein the micro-structure array includes a plurality of elongated prism members arranged in parallel; the reflecting mirror array includes a plurality of reflecting mirror units arranged in a matrix at intervals, and each of the reflecting mirror units is at an oblique angle with respect to an outputting surface of the micro-structure array.

* * * * *